Nov. 6, 1956 J. A. LAUCK 2,769,394
POWER UNIT
Filed Oct. 21, 1949
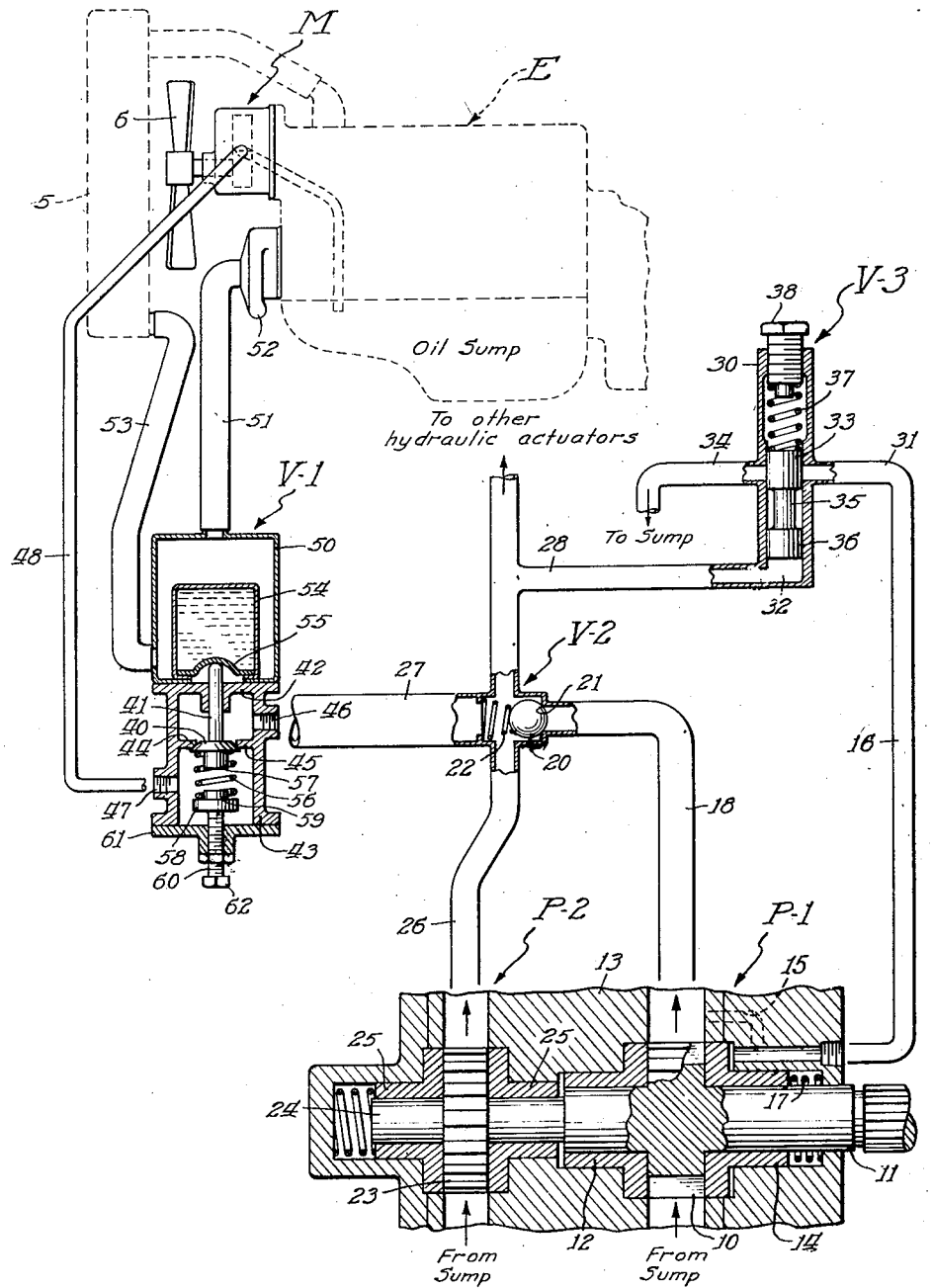
Inventor:
John A. Lauck

United States Patent Office

2,769,394
Patented Nov. 6, 1956

2,769,394

POWER UNIT

John A. Lauck, Shaker Heights, Ohio, assignor to Borg-Warner Corporation, Chicago, Ill., a corporation of Illinois Application October 21, 1949, Serial No. 122,787

3 Claims. (Cl. 103—11)

This invention relates to a liquid pressure power unit, and more particularly to a liquid pressure power unit arranged to supply fluid pressure continuously to one or more utilization devices having low volume requirements and arranged to supply fluid pressure intermittently to one or more other utilization devices having relatively high volume requirements. The invention is especially adapted for providing hydraulic operation of a plurality of devices associated with an automotive vehicle, such as a steering boost mechanism, windshield wipers, the window opening and closing mechanism and the seat positioning mechanism, as well as providing for driving the fan of the vehicle intermittently in accordance with the cooling requirements of the vehicle engine.

It has been realized for some time that operation by independent motors and driving means of the many separate devices provided in a modern automotive vehicle is not economical. It is, however, not unusual to provide individual motors, which may be either electric, pneumatic or vacuum motors, for operating the windshield wipers, the window opening and closing mechanism, the seat positioning mechanism, the top in the case of convertible automotive vehicles, as well as mechanically connecting the fan to the vehicle engine for continuous rotation thereby. In some cases booster means are associated with the brake, the clutch and the steering mechanism and various other hydraulically actuated mechanisms may be associated with the automotive transmission sometimes employed. Some of these devices are used only intermittently and some, such as the mechanism for operating a convertible top, very infrequently. Other devices, such as the fan used for cooling the vehicle engine, are commonly operated continuously, although as pointed out in my co-pending application Serial No. 44,664 filed August 17, 1948, now Patent No. 2,594,460, in the case of the fan at higher automobile speeds or under starting conditions when the engine is cold, it may be unnecessary and, in fact, undesirable to operate the fan continuously. A very substantial savings may be effected by operating the fan only when required, as it has been found that at sustained speeds of 40 to 50 miles per hour in an average automobile, approximately six horsepower are required for fan operation.

Thus, while it is obviously desirable to provide a single hydraulic system capable of supplying both the maximum and minimum power requirements of these auxiliary devices, because of the extremely wide and frequent variation in over-all power requirements in the course of operation, it has not been considered feasible or practical to employ a single power unit.

An object of the present invention is to provide a liquid pressure unit arranged to supply widely varying pressure requirements efficiently and economically.

In accordance with one embodiment of this invention, a plural unit pressure generator may be provided in a hydraulic system, the generator comprising a large, first, intermittently operated, intermeshing gear pump of the pressure loadable type and a second, smaller, continuously operating pump. These pumps may be connected in parallel and driven from a common shaft and the smaller pump then continuously supplies fluid pressure to the system, whereas the larger pump is pressure loaded only upon increased requirements of the system. A check valve is connected in the output of the larger pump to prevent return flow thereto and an adjustable pilot valve is also associated with the larger pump for controlling the operation thereof by controlling the pressure loading of the pump in accordance with the pressure requirement of the system. A combined, thermostatically operated, control and relief valve is connected in the system and arranged to open either in response to pressure exceeding a predetermined value or to an increased cooling requirement of the automobile engine. Opening of this valve causes a pressure drop in the system, in turn closing the pilot control valve of the pressure loadable pump and thereby applying the output of the larger pump to the system.

Other objects and advantages of this invention will be apparent from the following detailed description taken in conjunction with the drawing wherein the single figure is a diagrammatic view of a liquid pressure power unit constructed in accordance with this invention, portions of the several elements being shown in section to facilitate explanation.

The arrangement of this invention is designed to provide a continuous supply of fluid under pressure to various hydraulic actuating mechanisms, such as hereinbefore referred to, which may be employed in an automotive vehicle. The system is further designed to supply the intermittent, but very large pressure volume requirements of the cooling fan motor employed with the automotive vehicle engine. Ordinarily, the pressure volume requirements of the other hydraulic actuating mechanisms employed are far less than that required for driving the fan. It will be evident, however, that the system of this invention is capable of wide application and that while it is here shown used for this particular purpose, it may be employed equally well in other hydraulic systems having similarly varying fluid pressure requirements.

Referring to the drawing, P-1 is a large volume, intermittently operable, fluid pressure generator or pump of the intermeshing gear type and is employed primarily for supplying the large volume, intermittent fluid pressure requirements of a fan motor M associated with an automotive engine, designated generally at E. A radiator 5 may be positioned to the left and in front of fan blades 6, in accordance with conventional practice, and passage of air through the cooling fins of the radiator reduces the temperature of the engine coolant as it is circulated therethrough. A second pressure generator P-2 is connected in tandem with the pressure generator P-1 and also comprises an intermeshing gear type pump. Pressure generator P-2 may be made substantially smaller than the generator P-1 as pump P-2 is provided only to supply the generally lower pressure and volume requirements of other hydraulic actuating mechanisms which may be incorporated in the system and to provide pressure to actuate the unloading pump pilot control valve V-3, as will be more fully explained hereinafter.

A thermostatically actuated pressure relief and control valve V-1 is connected in the hydraulic system and arranged to open in response either to the pressure in the system exceeding a predetermined maximum value or in response to the temperature of the engine E exceeding a predetermined desired value, thereby requiring operation of the fan motor M or more rapid operation of the fan motor M. A check valve V-2 is connected in the output side of larger pump P-1 to prevent circulation of the output of the pump P–2 through the pump P–1 when the pump P–1 is not operating.

The pump P–1 is of the type shown in U. S. Patent No. 2,437,791 to Roth et al., wherein one set of the bushings of the pump are made pressure loadable and the loading pressure may be controlled in accordance with the pressure desired in the hydraulic system. More specifically, the pump P–1 comprises a driving pump gear 10 rotated by a shaft 11 and meshing with a driven pump gear (not shown). A first flanged bushing 12 is disposed on the left side of driving gear 10 and fixed in pump housing 13 while a second flanged bushing 14 is disposed on the right side of driving gear 10, the bushing 14 being axially movable in the housing 13 so that the forward or gear side face engaging surface thereof may move away from the adjacent gear surface to unload the pump. Discharge pressure from the pump P–1 is applied to the rear or motive surfaces of the bushing 14 through a suitable passage (not shown) which may, as described in U. S. Patent No. 2,420,622 to Roth et al. be formed at the point of convergence of the pressure loadable bushings of the driven and driving pump gears on the discharge side of the pump. Alternatively, a passage 15 may be provided which at its left end communicates with the discharge side of the pump as shown in the drawing and at its right and lower end, as viewed in the drawing, communicates with the pump terminus of the line or conduit 16. Pilot control valve V–3 is connected to the motive pressure chambers of the pressure loadable bushings by a conduit 16 and controls the application of pressure to the rear motive surfaces of the bushing 14, the pressure being relieved when the valve V–3 is open. Coiled compression spring 17, disposed about the periphery of shaft 11 adjacent the right end of bushing 14, maintains a minimum loading pressure on the bushing, and check valve V–2, connected in the output line 18 of the pump P–1, is selected to remain closed at the pressures produced by the pump P–1 in response to the loading provided by the spring 17. Output conduit 18 is connected through the check valve V–2 to the main hydraulic system.

More specifically, the check valve V–2 comprises a ball valve 20 arranged to seat on valve seat 21 formed at the left terminus of conduit 18 and having associated therewith a coiled compression spring 22, urging the ball valve against the seat 21 with sufficient force to overcome the delivery pressure generated by pump P–1 in response to the loading force applied by spring 17. The discharge pressure of pump P–1 when pressure loaded in response to the closing of pilot valve V–3 is, of course, sufficient to open check valve V–2.

The low volume pressure generator or pump P–2 may be a conventional intermeshing gear pump comprising the driving pump gear 23 mounted on a shaft 24 which is suitably drivably connected to the left end of shaft 11, and a driven pump gear (not shown). Bushings 25 are mounted on the right and left sides, respectively, of the gear pump and disposed in gear pump housing 13. The pump P–2 operates continuously so long as the shaft 11 rotates. The output of the pump P–2 is connected to the hydraulic system through a conduit 26, connected to the hydraulic actuating mechanisms (not shown) and connected by a conduit 27 to the inlet of valve V–1. The conduit 27 is connected to the hydraulic system on the outlet side of valve V–2, as is conduit 26. Conduit 26 is also connected by conduit 28 to the pilot control valve V–3.

From the foregoing it will be evident that when the pump P–1 is pressure loaded to render it effective, then the outputs of both pumps P–1 and P–2 are applied to the hydraulic system, whereas when the pump P–1 is unloaded only the output of pump P–2 is applied to the hydraulic system. Pump P–1 becomes pressure loaded in response to the pressure in the hydraulic system dropping below a predetermined minimum value, as set by the pilot valve V–3.

The pilot valve V–3 comprises a cylindrical valve housing 30 having a side inlet 31 to which the conduit 16 leading to the motive surfaces of the pressure loading bushing 14 is connected and a base inlet 32 to which the branch conduit 28 connected to the hydraulic system is connected. A cylindrical valve body 33 is journalled in housing 30 and is axially movable therein so that it may be shifted downwardly to close the inlet 31, or is movable upwardly, as viewed in the drawing, to open inlet 31 and permit pressure acting on the motive surfaces to escape through the conduit 16 to the sump through outlet 34 of valve 33. Valve body 33 has a stem 35 affixed to its lower side, and the stem 35 is of substantially smaller cross-sectional dimension than the valve body whereby when the valve body is moved upwardly, an annular passage is provided therearound from the inlet 31 to the outlet 34. Affixed to the lower end of valve stem 35 is a piston 36 journalled in the lower portion of housing 30 and having its lower side exposed to pressure in the hydraulic system applied to the lower portion of valve housing 30 by the conduit 28 connected to port 32. Normally the pressure in the system is effective to hold the valve 33 in raised position, but of course a suitable limit stop (not shown) may be provided to prevent the valve from dropping too low in the housing. A coiled compression spring 37 is disposed in the upper portion of housing 30 and its lower end bears against the upper side of valve body 33, while the upper end of the spring 37 bears against the lower end of an adjustable cap member 38 threaded into the upper end of housing 30. By properly selecting the compression value of spring 37, and by adjustment of the threaded member 38, the pressure at which the valve V–3 will open to permit escape of pressure from the conduit 16 can be readily preselected. Ordinarily this pressure value would be set at the minimum pressure required for operating other hydraulic actuating mechanisms besides the fan motor M. Thus, when the valve V–1 opens in response to increased cooling requirements of the engine E, and the pressure drops in the hydraulic system, the pressure then acting against the under side of the piston 36 tending to force the valve 33 upward into open position would be reduced and the spring 37 would push the valve downward into closed position, thus rendering the larger pump P–1 operative. When the pressure in the hydraulic system is sufficient to overcome the force exerted by spring 37, the piston 36 is then shifted upwardly, moving valve 33 to open position and opening the valve V–3, thereby permitting unloading of pump P–1.

In order to control the operation of the fan motor M in accordance with the temperature requirements of the engine E and particularly the cooling thereof, valve V–1 is made to open in response to the temperature of the engine E exceeding a predetermined value. The valve V–1 comprises a disc valve 40 mounted at the lower end of a stem 41 journalled in the upper end plate 42 of valve housing 43. A valve seat 44 is formed in the valve housing 43 by an annular, inwardly extending flange 45 integrally formed with the housing 43 approximately at the midportion thereof and immediately beneath inlet port 46 connected with conduit 27. An outlet port 47 is formed in the lower left side wall of housing 43 beneath, or on the other side of the seat 44 from the side occupied by the inlet port 46. Outlet port 47 is connected through conduit 48 to the fan motor M. When the valve 40 is seated on valve seat 44, the valve V–1 is closed and no pressure is applied to the fan motor.

Opening of the valve V–1 is controlled or effected in response to either of two conditions. Primarily, the valve V–1 is intended to open in response to an increased cooling requirement of the engine E. For this purpose, a tank-like enclosure 50 is mounted on the upper side of housing 43 and is connected through a conduit 51 to the pump 52 of engine E. A second connection is made to the tank 50 by a conduit 53, the other end of conduit 53 being connected to the engine radiator 5; thus the coolant employed with the engine E may be circulated through the radiator, the tank 50 and the engine and accordingly, the temperature of the coolant in the tank 50 will be indicative of the temperature of the coolant supplied to the engine E. Disposed within the tank 50 is a reservoir 54 of substantially smaller dimensions, as shown on the drawing, and this reservoir may be filled with alcohol or other suitable fluid which will not freeze and which has the required, relatively high, temperature coefficient of expansion. The lower end of reservoir 54 is formed by a diaphragm 55 which must be flexible and accordingly may be made of rubber or other suitable material or a Sylphon type bellows may be used. The upper end of valve stem 41 extends substantially beyond cover plate 42 and bears against the under side of the flexible diaphragm 55. The valve stem may thus be pushed downwardly by expansion of the fluid in reservoir 54.

Normally, however, the valve disc 40 is urged upwardly into seating relation with valve seat 44 by a coiled compression spring 56 disposed in the lower portion of valve housing 43 and having its upper end bearing against the under side of disc valve 40, the spring being maintained in proper location with respect to valve 40 by an integrally formed boss 57 extending downwardly from the base of valve 40. The lower end of coiled spring 56 bears against a pedestal member 58 of generally disc-shape having a boss 59 formed on the upper surface thereof to cooperate with boss 57 in maintaining proper location of spring 56. The pedestal member 58 is mounted on the upper end of a threaded shaft 60, the shaft being threaded in the lower end cover 61 of housing 43. A knob 62 may be provided on the exposed lower end of shaft 60 to permit adjustment of the position of pedestal 58 and thus the seating force exerted by spring 56.

The valve V-1 thus may operate as a relief valve, and when the pressure in the hydraulic system, despite the unloading of pump P-1 exceeds a predetermined maximum value, opening of valve V-3 causes such pressure to be applied to motor M. Ordinarily, it will be understood that the pump P-1 would be unloaded and such excessive pressure would be developed only by the pump P-2 under the condition wherein none of the hydraulic actuating means served thereby were in operation. Spring 56 is selected to provide sufficient force to hold valve 40 closed up to the desired maximum continuous pressure. The force of spring 56 can, of course, be overcome at any time by expansion of the temperature responsive fluid contained in tank 54.

Under starting conditions or when the ram effect of air passing through the radiator 5 due to vehicle movement is sufficient to supply adequate cooling without the fan 6 being rotated, then the temperature of the engine E will be such that the fluid in reservoir 54 will be contracted and diaphragm 55 will, therefore, be in its uppermost position, permitting valve disc 40 to seat and close valve V-1. With valve V-1 closed, pressure in the hydraulic system normally will be sufficient to open valve V-3 permitting pump P-1 to be unloaded. Thereafter, and under these conditions, pump P-2 provides the sole pressure source for the system. Upon the engine E increasing its temperature, the fluid in reservoir 54 will expand forcing diaphragm 55 downwardly thereby opening the valve V-1. Opening of the valve V-1 causes an immediate pressure drop in the main hydraulic system and pilot valve V-3 will then close, being actuated by spring 37. Closing of pilot valve V-3 causes pressure to build up behind the motive surfaces of the pressure loadable bushing 14, thereby loading pump P-1 and rendering it effective. The output of pump P-1 is, of course, sufficient when loaded to overcome the resistance of spring 22 associated with check valve V-2 and the pump delivers pressure to the entire system. The valve V-1 will remain open until the temperature of the engine E has been reduced to the desired operating level, the actual closing point being predetermined by the length of the valve stem 41 with reference to the position of valve disc 40 and diaphragm 55.

It will be understood that the valve V-1 and the valve V-3 are capable of partial opening; that is to say, these valves will provide varying degrees of pressure flow. Thus, for example, partial opening of valve V-1 will permit the fan motor to rotate the fan at a relatively slow speed as compared with full opening of valve V-1. Similarly, the valve V-3 may close partially to partially load pump P-1, as for example when the pressure flow requirements of the fan motor are small. The pump P-1 may also become loaded in response to a large demand from the other hydraulic actuating mechanisms incorporated in the system, causing a drop in the system hydraulic pressure below the predetermined minimum set by spring 37 of pilot valve V-3.

While but one embodiment of this invention has been shown and described, it will be understood that many changes and modifications may be made therein without departing from the spirit or scope of the invention.

What is claimed is:

1. In a fluid pressure system subject to variable pressure and temperature conditions, a pair of parallel connected pumps, one of which has a fixed displacement and the second of which is provided with an axially movable pressure loadable bushing, means to pressure load said bushing, said pumps having interconnected outlets, means to prevent the flow of fluid from said fixed displacement pump to said second pump, means connected in said system beyond said flow preventing means and to said second pump operable to cause an unloading of said bushing at and above a predetermined system pressure, and means connected in said system beyond said flow preventing means responsive to temperature and/or pressure providing a pressure drop in said system and thereby affecting said system connected means, said last-two-named means controlling the output of said second pump, said fixed displacement pump normally supplying the pressure requirements of said system and said second pump assisting said fixed displacement pump at requirements above normal.

2. In a fluid pressure system subject to variable pressure and temperature conditions, a pair of parallel connected pumps, one of which has a fixed displacement and the second of which is provided with axially movable pressure loadable bushings, means to pressure load said bushings, said pumps having interconnected outlets, means to prevent the flow of fluid from said fixed displacement pump through said second pump, means connected in said system beyond said flow preventing means and to said second pump resiliently urged to a position allowing the pressure loading of said bushings below a predetermined system pressure, and means connected in said system beyond said flow preventing means responsive to temperature and/or pressure providing a pressure drop in said system and thereby affecting said system connected means, said last-two-named means controlling the otuput of said second pump, said fixed displacement pump normally supplying the pressure requirements of said system and said second pump assisting said fixed displacement pump at requirements above normal.

3. In a fluid pressure system subject to variable pressure and temperature conditions, a pair of parallel connected pumps, one of which has a fixed displacement and the second of which is provided with axially movable pressure loadable bushings, means to pressure load said bushings, said pumps having interconnected outlets, a check valve to prevent the flow of fluid from said fixed displacement pump to and through said second pump, a pilot valve connected in said system beyond said check valve and to said second pump, said pilot valve being operable to cause an unloading of said bushings at and above a predetermined pressure system and being resiliently urged to a position allowing the loading of said bushings below said predetermined system pressure, and a control valve connected in said system beyond said flow preventing means, said control valve being responsive to temperature and/or pressure and providing a pressure drop in said system to thereby affect said pilot valve, said pilot valve and said control valve controlling the output of said second pump, said fixed displacement pump normally supplying the pressure requirements of said system and said second pump assisting said fixed displacement pump at requirements above normal.

References Cited in the file of this patent

UNITED STATES PATENTS

| Number | Name | Date |
|---|---|---|
| 1,002,306 | Perkins | Sept. 5, 1911 |
| 1,109,349 | Mealey | Sept. 1, 1914 |
| 1,333,660 | Hutchins | Mar. 16, 1920 |
| 1,820,035 | Stokes | Aug. 25, 1931 |
| 1,877,091 | Vickers | Sept. 13, 1932 |
| 1,982,711 | Vickers | Dec. 4, 1934 |
| 2,074,618 | Roeder | Mar. 23, 1937 |
| 2,366,388 | Crosby | Jan. 2, 1945 |
| 2,420,622 | Roth et al. | May 13, 1947 |
| 2,437,791 | Roth et al. | Mar. 16, 1948 |
| 2,499,563 | Bill | Mar. 7, 1950 |
| 2,542,839 | Reggio | Feb. 20, 1951 |